United States Patent Office 3,558,710
Patented Jan. 26, 1971

3,558,710
PREPARATION OF AMINE OXIDES
IN NONPOLAR SOLVENT
Joseph S. Stalioraitis, Chicago, Ill., and Charles S. Wilhelmy, Morris Plains, N.J., assignors, by mesne assignments, to Armour Industrial Chemical Company, a corporation of Delaware
No Drawing. Filed Nov. 30, 1967, Ser. No. 686,805
Int. Cl. C07c 85/16, 135/02
U.S. Cl. 260—584                  7 Claims

ABSTRACT OF THE DISCLOSURE

Substantially anhydrous amine oxides are prepared by reacting a tertiary amine such as di-2-hydroxy ethyl coco amine with hydrogen peroxide in a nonpolar solvent such as benzene and removing water from the reaction mass azeotropically.

---

The prior art has proposed the preparation of amine oxides from tertiary amines by reaction with hydrogen peroxide in an aqueous reaction medium or one that contains polar solvents such as acetone. In other instances the reaction has been carried out wherein water is added to the system or wherein the reaction was carried out in the presence of a catalyst. These prior art methods, while satisfactorily producing amine oxides, suffer in that the amine oxide is not recovered in the substantially anhydrous state or recovery is difficult. Additionally, these prior art methods necessitate the use of expensive catalysts or the use of polar solvents which create attendant difficulties in recovering the amine oxide or in carrying out the reaction.

This invention therefore pertains to a process for the preparation of amine oxides which overcomes the above objections. More particularly, the invention provides a novel improved process for the preparation and recovery of amine oxides in the substantially anhydrous state. Even more specifically, the invention pertains to the production of substantially anhydrous amine oxides by reacting a tertiary amine with hydrogen peroxide in a nonpolar solvent and simultaneously removing water and solvent during the reaction by azeotropic distillation.

It is therefore an object of this invention to prepare amine oxides from tertiary amines while carrying out the reaction in a nonpolar solvent.

It is still a further object of this invention to produce amine oxides by reacting tertiary amines with hydrogen peroxide in nonpolar solvent and simultaneously removing water and solvent from the reaction vessel.

It is another further object of this invention to produce substantially anhydrous amine oxides by reacting a tertiary amine with hydrogen peroxide in nonpolar solvent and thereafter removing water from the reaction mass azeotropically.

Another object of this invention is to prepare substantially anhydrous amine oxides by reacting a tertiary amine such as di-(2-hydroxy ethyl) coco amine with hydrogen peroxide in a nonpolar solvent such as xylene with the simultaneous removal of water from the reaction mass by azeotropic distillation.

It is still a further important object of this invention to improve the method of producing amine oxides wherein a tertiary amine is reacted with hydrogen peroxide by carrying out the reaction in nonpolar solvent, azeotropically removing the water from the reaction mass and thereafter recovering amine oxide.

These and other further important objects will become apparent from the hereinafter commentary and from reference to the specific, detailed examples. These examples are to be taken as exemplary and as illustrating the invention but in no sense delimiting of the invention or of confining the discovery to the disclosed reactants.

Generally, the method of the invention comprises taking a tertiary amine and fluidizing same with a suitable amount of a nonpolar solvent and thereafter adding a peroxide such as hydrogen peroxide over a period of time in order to obtain reaction and conversion of the tertiary amine to the amine oxide. It is generally preferred to heat the amine-solvent mixture prior to hydrogen peroxide addition. During or after the reaction is completed, water obtained from the solution of hydrogen peroxide as well as that obtained as a reaction product is removed along with the nonpolar solvent by azeotropic distillation thereby leaving substantially anhydrous amine oxide as the end product. Generally speaking, the azeotropic distillation conditions will vary with the type of nonpolar solvent used, but in each case it is important to the process that the temperature and the pressure be such that they are below the decomposition point of the specific amine oxide formed.

Specifically, to a reaction vessel, such as a round bottomed flask or esterifier with approximately 32–35% head space, there is added a tertiary amine. Depending upon the molecular weight of the tertiary amine, there is added a sufficient amount of nonpolar solvent to substantially fluidize the amine-solvent mixture to insure proper contact with the later added hydrogen peroxide. Heat is applied to the reaction flask and hydrogen peroxide is added, while the mixture is stirred. The peroxide may be added in solution form wherein the hydrogen peroxide concentration is within the range of 1–90%, the preferred range being about 30–50%. Those skilled in the art will recognize that the only limitations of $H_2O_2$ concentration are safety ones.

Where it is desired and in the preferred form of the invention, the reaction mass is maintained at reflux temperatures during $H_2O_2$ addition. Because the reaction involved is exothermic, it may be necessary to cool the reaction mass and maintain temperatures below the decomposition temperature of the formed amine oxide. Ordinarily, the temperature should not be over 100° C. and preferably will be within the range of about 70–80° C.

After a period of time it may be necessary to add additional solvent in order to maintain fluidity of the reaction mass mixture. After completion of the reaction and/or after azeotropic distillation, it will be found that amine oxide is recovered in the substantially anhydrous state, i.e., 1–2% water by analysis. Reaction times may vary but ordinarily from about ½–10 hours will suffice.

It is possible and desirable to maintain a continuous cyclic process wherein tertiary amine, solvent and $H_2O_2$ are continuously added to the reactor. In such case, the solvent-water mixture removed by azeotropic distillation is treated to separate the solvent from the water and the solvent is recirculated into the reactor. Other obvious expedients will be readily observable to those skilled in the art.

Any tertiary amine in which the amino nitrogen atom is the primary reactive moiety which is oxidized to the corresponding amine oxide may be used in the methods disclosed herein. Suitable amines thus include the tertiary amines in which the groups directly bonded to the amino nitrogen atom are hydrocarbon groups and those in which the groups directly bonded to the amino nitrogen atom are substituted-hydrocarbon in character. The groups bonded to the amino nitrogen atom may be aliphatic or aromatic in character. The aliphatic groups may be of a branched chain or a straight chain configuration or they may be cyclic in character; they may be saturated or they may be olefinically unsaturated. Suitable tertiary amines may be homogenous in character—all the groups bonded to the amino nitrogen ring being similar in character or they may be heterogeneous in character—mixed amines wherein two or more of the groups bonded to the amino nitrogen atom are dissimilar in character.

Tertiary amines particularly suitable for the practice of this invention include those of the formulae:

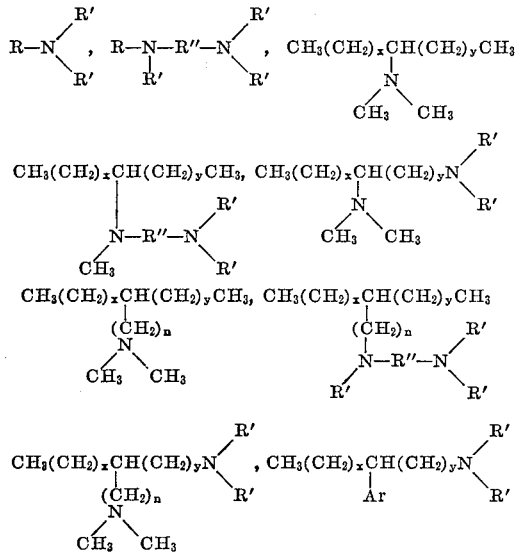

and

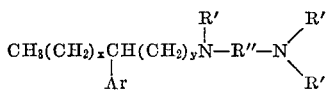

wherein:

R is of the group $C_6$–$C_{22}$ alkyl and alkenyl;
R' is of the group of methyl, $(CH_2CH_2O)_zH$ and

R'' is of the group of $C_2$–$C_6$ alkylene;
$x$ and $y$ are positive integers having a sum from 1 to about 22;
$z$ is a positive integer from 1 to about 25; and
$n$ is a positive integer from 1 to about 2 and Ar is of the group of phenyl, naphthyl, phenyl substituted with from 1 to 2 groups selected from methyl, hydroxy methoxy and phenoxy.

Other amines as well as processes of preparing these amines may be found in copending U.S. patent application Ser. No. 434,607, filed Feb. 23, 1965, now U.S. Pat. No. 3,398,197 and U.S. patent application Ser. No. 591,403, filed Nov. 2, 1966, now U.S. Pat. No. 3,494,962, the disclosures of which are hereby incorporated by reference and each of which have the same assignee as the instant application.

The types of amine oxides formed according to the hereinbefore disclosed invention may be of the following formulae:

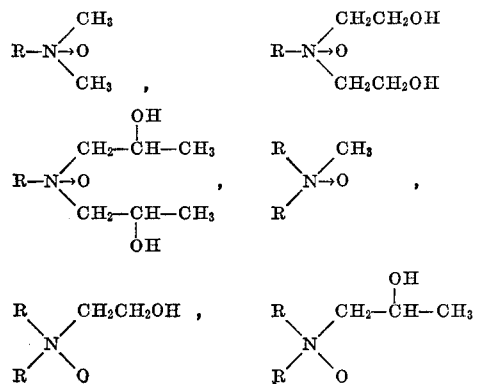

wherein R is any one of the following radicals: coco, tallow, soya, $C_8$ to $C_{18}$ or any mixtures of the foregoing.

The hydrogen peroxide employed may be in the form of an anhydrous gas, or liquid or it may be in the form of an aqueous solution containing from about 10% to about 90% by weight of hydrogen peroxide. Particularly useful are the commercially available aqueous solutions containing from about 35% to about 70% by weight of hydrogen peroxide. It is preferable that the highest practical concentration of hydrogen peroxide consistent with safe handling be employed because the presence of higher concentrations of hydrogen peroxide in the reaction mixture depresses the formation of side products and results in the formation of higher yields of the desired amine oxide product. Also, since water is subsequently removed, the less water added the better. For the same reason, while it is quite feasible to employ stoichiometric quantities of the hydrogen peroxide relative to the amine reactant—i.e., one mole of hydrogen peroxide per mole of amine—it is desirable that the hydrogen peroxide be present in the reaction zone in an amount somewhat in excess of the theoretical amount. The excess of hydrogen peroxide need not exceed 100%, and in most cases an excess of hydrogen peroxide of about 10 to 50% will be found sufficient for the desired purpose.

The oxidation of the amine can be carried out at atmospheric, superatmospheric or subatmospheric pressure, as may be desirable. In the great majority of cases, it will be found that operation at substantially atmospheric pressure will be found to be most convenient. Preferred temperatures for effecting the reaction are of the order of from about 40° C. to about 80° C. In most cases, little advantage will be obtained through the use of temperatures in excess of about 100° C., as compared to the use of somewhat lower temperatures. As a matter of fact, temperatures approximating 100° C. will be detrimental as the amine oxide formed will decompose. Under these conditions of temperature and pressure, reaction times of the order of from about one-half hour to about ten hours will be found sufficient to effect the desired reaction to completion.

Examples of the nonpolar solvents which are suitable for use in the practice of this invention include but are not limited to benzene, toluene, xylene, high boiling mineral spirits, kerosene, carbon tetrachloride and the like solvents, of which the art is well aware. Mixtures of solvents of the foregoing may be used if desired.

The amount of the nonpolar solvent used is not critical. In general, sufficient nonpolar solvent should be employed to dissolve the intended solutes and to provide a readily fluid reaction mixture. Generally, a weight of nonpolar solvent amounting to at least the weight of the amine reactant is required, and in most cases at least twice this amount of nonpolar solvent is desirable. Usually, not more than about five to ten times the weight of the amine reactant of nonpolar solvent need be used. In most cases a weight of nonpolar solvent of from about 3 to about 6 times the weight of the amine reactant is most convenient.

In conducting the reaction of the amine and the hydrogen peroxide, it is desirable that the reactants be brought together slowly, and not all at once. The order in which the reactants are introduced into the reaction mixture is not critical. In most cases, it will be found most desirable that the amine reactant be mixed with the nonpolar solvent, and the hydrogen peroxide added slowly to the stirred reaction mixture, the reaction temperature being controlled by heating or cooling as necessary. This is not to say that the reverse order of mixing may not be used. However, addition of the hydrogen peroxide to the amine is the preferred technique, since it permits better control of the reaction and minimization of undesired byproducts.

This invention is further illustrated by the following specific examples wherein the end product, amine oxide, was determined and analyzed for by the following procedure:

A first sample is titrated with acid to yield free amine and amine oxide; a second sample is treated with methyl iodide which converts the free amine to quaternary ammonium iodide which is nontitratable; the second sample is then titrated to yield amine oxide (which is titratable); and from the difference between the two samples, the amount of free amine and thusly the amount of amine oxide may be determined.

The foregoing analysis procedure is set forth at Analytical Chemistry, vol. 34, page 1849, 1962.

EXAMPLE I

To 574 g. di-2-hydroxyethyl coco amine ("Ethomeen C/12") in a reactor was added 456 g. toluene. To the amine-solvent mixture was added 163 g. of 46 wt. percent hydrogen peroxide solution, while stirring the reaction mass, over an addition period of 1½ hours at a temperature of 70°–76° C. Conversion of amine to amine oxide took place over a period of about 4–5 hours over which the temperature of the reaction mass was about 76°–84° C. Azeotropic distillation of the resultant reaction mass at 83°–89° C. at atmospheric conditions over a period of about 5 hours yielded amine oxide and other products having the following analysis by wt. percent: amine oxide, 45.2; free amine, 1.4; $H_2O_2$, .6; $H_2O$, –; Gardner color, –.

EXAMPLE II

Using the same general procedure as indicated in Example I substituting the reactants as follows:

| | G. |
|---|---|
| Di-2-hydroxyethyl coco amine | 578 |
| Benzene | 457 |
| 64 wt. percent $H_2O_2$ soln. | 117 | the resultant product was analyzed as follows: amine oxide, 52.4; free amine, 1.9; $H_2O_2$, .65; $H_2O$, 2.0; Gardner color, 1.

The following table represents the time sequence for the above, illustrating the simultaneous distillation aspect of the invention:

| Time | Temp., °C. Pot | Temp., °C. Vapor | $H_2O_2$, In, ml. | $H_2O$ Off, ml. |
|---|---|---|---|---|
| 10:50 | 52 | | 0 | 0 |
| 10:55 | 72 | | 17 | 0 |
| 11:30 | 75 | 70 | 58 | 0 |
| 12:00 | 74 | 70 | 94 | 10 |
| 12:30 | 74 | 70 | | 21 |
| 1:00 | 75 | 70 | | 34 |
| 1:30 | 77 | 72 | | 45 |
| 2:00 | 78 | 74 | | 54 |
| 2:30 | 79 | 76 | | 62 |
| 3:00 | 80 | 76 | | 68 |
| 3:30 | 82 | 77 | | 72 |
| 4:00 | 83 | 77 | | 75 |
| 4:30 | 83 | 77 | | 76 |

EXAMPLE III

Using an esterifier with 32–35% head space a plant-batch run was conducted using the following materials according to the previously described procedure:

| | Lbs. |
|---|---|
| "Ethomeen C/12" | 1450 |
| Xylene | 3160 |
| 50% $H_2O_2$ | 361 |

The following tables represent the time sequence and analysis of this run:

TABLE IIIa.—TIME SEQUENCE

| Addition $H_2O_2$ | 1 hour | 65–70° C. |
|---|---|---|
| Conversion | 7.5 hours | 65–70° C. |
| Azeotrope and concentration | 8 hours | 42–55° C./40 mm. Hg. |

TABLE IIIb.—ANALYSIS

| Amine oxide | Free amine | $H_2O_2$ | $H_2O$ | Gardner color |
|---|---|---|---|---|
| 28.6 | .69 | .68 | | |
| 49.5 | .72 | | 1.4 | 1.2 |

EXAMPLE IV

The following tabulated data, which is self-explanatory, depicts the results and conditions of still another run, following the general procedures heretofore described:

TABLE IVa

Reactants:
402 g. "Ethomeen C/12"
349 g. Xylene
82 g. 64% act. $H_2O_2$

Theoretical yield:
424 g. Amine oxide
349 g. Xylene
57 g. $H_2O$

| Time | Temp., °C. Pot | Temp., °C. Vapor | Pressure, mm. Hg | $H_2O_2$ in grams | Water off, mls. | Amine oxide | Free amine | $H_2O_2$ | $H_2O$ |
|---|---|---|---|---|---|---|---|---|---|
| 10:30 | 49 | 34 | 80 | | | | | | |
| 10:35 | 54 | 44 | 80 | | | | | | |
| 10:45 | 59 | 45 | 86 | 41 | 10 | | | | |
| 11:00 | 59 | 29 | 70 | | 22 | 45.7 | 5.4 | 1.15 | |
| 11:15 | 59 | 45 | 80 | 82 | 30 | | | | |
| 11:30 | 55 | 39 | 46 | | 42 | | | 1.54 | |
| 11:45 | 56 | 39 | 40 | | 47 | | | | |
| 12:00 | 56 | 42 | 20 | | 51 | 49.4 | 4.3 | 1.6 | |
| 12:35 | 65 | 59 | 20 | | 54 | | | | |
| 1:00 | 67 | 60 | 20 | | 54 | 54.0 | 4.5 | 1.2 | |
| 4:35 | 62 | 34 | 20 | | 55 | Added 50 ml. xylene | | | |
| 4:45 | 60 | 56 | 20 | | 55 | | | | |
| Final | | | | | 62 | 54.4 | 1.3 | .47 | 2.4 |

EXAMPLE V

Using the general aforedescribed procedure N-methyl-N, N-di-phenyl-octadecyl amine is substituted for the amine in Example IV and N-methyl-N, N-di-phenyl-octadecyl amine oxide is recovered in the substantially anhydrous state.

While in the foregoing specification this invention has been described in relation to specific embodiments thereof and many details have been set forth for purpose of illustration, it will be apparent to those skilled in the art that the invention is susceptible to additional embodiments than those specifically disclosed herein, and that certain of the details as previously set forth can be varied without departure from the basic principles of the invention.

We claim:
1. In the method of producing an amine oxide wherein a tertiary amine selected from the group consisting of di-2-hydroxyethyl coco amine and N-methyl-N, N-di-phenyl-octadecyl amine is reacted with hydrogen peroxide, the improvement which comprises carrying out the reaction in a nonpolar solvent selected from the group consisting of benzene, toluene, xylene, mineral spirits, kerosene, carbon tetrachloride and mixtures thereof and azeotropically removing water from the reaction mass, at a temperature below the decomposition temperature of the amine oxide formed in said reaction.

2. The method according to claim 1 wherein said distillation is carried out during said reaction.

3. The method according to claim 2 wherein said solvent is removed with said water and additionally includes separating said solvent from said water and recirculating said solvent to said reaction mass.

4. The method according to claim 3 wherein said amine oxide is recovered in the substantially anhydrous state.

5. The method according to claim 1 wherein said tertiary amine is di-2-hydroxyethyl coco amine and said nonpolar solvent is xylene.

6. The method according to claim 5 wherein said reaction is carried out at a temperature range of about 40°–80° C.

7. The method of producing di-2-hydroxyethyl coco amine oxide which comprises the steps of:
  (a) fluidizing di-2-hydroxyethyl coco amine with xylene to form a first mixture,
  (b) adding hydrogen peroxide to said first mixture, while agitating, over a period of time to form a second mixture and maintaining the temperature at about the reflux temperature of said second mixture;
  (c) azeotropically distilling water and xylene from said second mixture, allowing the reaction to run to completion, and
  (d) recovering di-2-hydroxyethyl coco amine oxide.

References Cited
UNITED STATES PATENTS

| | | | |
|---|---|---|---|
| 2,169,976 | 8/1939 | Guenther et al. | 260—583(D)X |
| 3,390,182 | 6/1968 | Kollar et al. | 260—583(D) |
| 3,431,071 | 3/1969 | Simpson et al. | 260—583X |
| 3,433,788 | 3/1969 | Somekh et al. | 260—583X |

CHARLES B. PARKER, Primary Examiner

R. L. RAYMOND, Assistant Examiner

U.S. Cl. X.R.

260—570.8, 583